United States Patent

[11] 3,607,851

| [72] | Inventor | Lawrence E. Forman |
| | | Akron, Ohio |
| [21] | Appl. No. | 819,089 |
| [22] | Filed | Apr. 24, 1969 |
| [45] | Patented | Sept. 21, 1971 |
| [73] | Assignee | The Firestone Tire & Rubber Company |
| | | Akron, Ohio |

[54] POLYMERIZATION OF CONJUGATED DIOLEFINS
1 Claim, No Drawings

[52] U.S. Cl. ............................................. 260/94.2 M,
252/431 R, 260/83.7 R, 260/93.5 S, 260/94.7 R
[51] Int. Cl. ............................................. C08f 7/04,
C08d 3/08, C08d 1/16
[50] Field of Search ............................................. 260/94.2
M, 83.7, 94.2 T, 94.7

[56] References Cited
UNITED STATES PATENTS

| 2,797,208 | 6/1957 | Burke | 260/83.7 |
| 3,294,768 | 12/1966 | Wofford | 260/83.7 |

*Primary Examiner*—James A. Seidleck
*Attorneys*—S. M. Clark and Gordon B. Seward ABSTRACT: Conjugated diolefins, with or without vinyl aromatic comonomers, are polymerized using a catalyst which is a combination of ROK and R'K, where R is an alkyl or alkenyl radical, and R' is an alkenyl radical. Polymerization of 1,3-butadiene in this system results in a product which is primarily trans-1,4-polybutadiene, with essentially no cis-1,4-polybutadiene.

3,607,851

POLYMERIZATION OF CONJUGATED DIOLEFINS

BACKGROUND OF THE INVENTION

It is an object of the present invention to provide a means for polymerizing conjugated dienes to produce a specific desired microstructure in the polymers produced. It is another object of the invention to produce polybutadiene having predominantly *trans*-1,4 microstructure. These and other objects are accomplished as explained in the following specification and examples.

The polymerization of conjugated dienes has been accomplished in a number of different ways. Thermal methods are found to yield only dimers and low molecular weight oligomers instead of the high molecular weight polymers that are frequently desired for industrial use. Free-radical catalysts have been employed often in emulsion systems to form polybutadienes and the commercial copolymers of butadiene and styrene known as SBR. More recently, various other catalyst systems employing organometal compounds such as the alkyllithium, and aryllithium catalysts, and the coordination catalysts based on alkylalumiunum compounds in conjunction with a compound of certain transition metal elements have been developed, some of them to commercial utilization.

Among the polymerization catalysts that have been based on the metals of Group I of the Periodic system, those pertaining to the first member, lithium, have been most extensively developed and utilized. Catalysts based on the second and third members, sodium and potassium, as the metals, were in use in Germany and Russia in the early part of this century. They were reinvestigated in the U.S. as a part of the Rubber Reserve program during World War II.

A catalyst system of considerable interest in the period of the Rubber Reserve Program was the so-called "Alfin" catalyst which was extensively studied in both university and industrial laboratories. This catalyst system was based on sodium, and its name, coined by Professor A. A. Morton of the Massachusetts Institute of Technology, devolved from the fact that an alcohol and an olefin were involved. As first discovered, the catalyst combination was derived from the cleavage of isopropyl ether by amylsodium followed by metalation of the propylene eliminated in the cleavage reaction (J. Am. Chem. Soc. 69, 950 (1947)). There results from this reaction sequence a catalyst complex comprised of allylsodium with sodium isopropoxide. Later developments of this catalyst included the incorporation of sodium chloride to form a three-component complex. Both complexes are insoluble in the preferred solvents which are paraffinic or aromatic hydrocarbons. The activity of this catalyst combination with, e.g. butadiene is notable by the rapid formation of a very high molecular weight polybutadiene with about 70 percent *trans*-1,4 configuration which is in contrast to the activity of alkylsodium, e.g. amylsodium, where there is a much slower reaction producing a much lower molecular weight polybutadiene having about 70 percent -1,2 mode of addition configuration. By far the most successful use of this system has been with sodium as the alkali metal. Extensive experiments substituting the other alkali metal salts have been generally unrewarding with respect to the polymerization activity of the resultant catalysts.

SUMMARY OF THE INVENTION

It has now been found, unexpectedly, that an analogue of the Alfin catalyst, having potassium instead of sodium as the counterion, provides a polymer of butadiene from which a substantial portion of trans-1,4-polybutadiene may be separated.

Additionally, the catalytic effect has been accomplished using a catalyst which, unlike the standard Alfin catalyst, requires no associated alkali metal halide salt.

DESCRIPTION OF THE PREFERRED EMBODIMENT

The preferred catalyst of the invention is a complex containing RK and R'OK, where R is an alkenyl radical of from 2 to 10 carbon atoms, and R' is an alkyl or alkenyl radical of from 2 to 10 carbon atoms. The recommended catalyst is a combination of allylpotassium and potassium allyl alkoxide.

Monomers of the invention are those which have been employed with alfin catalysis, namely, conjugated diolefins, and vinyl-aromatics. Homopolymers, or copolymers of two or more of these monomers can be produced. Preferred is 1,3-butadiene. Vinyl aromatic comonomers such as styrene, may be included also.

Polymerization usually is best accomplished in the presence of an inert diluent, for reasons of handling the polymer, and for heat transfer in the reaction zone. A normally liquid hydrocarbon solvent which is inert to the reactants is preferred. Aromatic hydrocarbons such as benzene or toluene can be used; straight-chain aliphatic hydrocarbons, such as n-hexane or n-heptane are very effective. Because of the volatility of the monomers, a pressurized reactor may be used advantageously.

A better understanding of the invention may be obtained by reference to the following examples. Unless otherwise indicated, all measurements are by weight and yields are given in weight-percent.

EXAMPLE I

A polymerization catalyst was prepared as follows:

Into a cooled flask (with a high-speed stirrer) were charged 350 ml. of 99 percent heptane and 58.3 grams of a 33.55 percent paste of potassium in vaseline. This mixture was stirred into a slurry and cooled to 3° C. A solution of 24.53 grams of diallyl ether in 80 ml. of heptane was added drop-wise over 50 minutes time. The batch temperature rose to 10° C. The slurry was warmed to room temperature and washed into a bottle with 200 ml. of heptane, under an atmosphere of argon.

Cleavage of diallyl ether by potassium yields potassium allyl alchoholate and allylpotassium. The theoretical yield for 0.25 mole of diallyl ether and 0.50 mole of potassium would be 0.25 mole each of the alcoholate and the allylpotassium. The total weight of the slurry was 694 grams.

EXAMPLE II

Using the catalyst prepared in example I, butadiene-1,3 was polymerized as follows:

32 grams of butadiene-1,3, 120 grams of hexane and 3.5 ml. of the catalyst were charged to a beverage bottle, which was capped. Polymerization proceeded under agitation for 13 days at 11°–14° C.

The resultant polymer was found to be in two phases, and was separated by fractionation with n-pentane. 8.5 grams of polymer soluble in n-pentane at room temperature were recovered, and 18.8 grams of polymer which was insoluble in n-pentane at room temperature.

Infrared analysis of the insoluble portion revealed its microstructure to be:

| | |
|---|---|
| cis—1,4 | 0.0% |
| trans-1,4 tg 93.0 % | |
| 1,2 | 6.9% |

I claim:

1. The process of preparing predominately trans-1,4-polybutacliene by contacting 1,3-butadiene with a catalyst comprising essentially equimolar quantities of potassium allyloxide and allylpotassium in a polymerization zone at about 11°–14° C. in the presence of an inert straight chain aliphatic diluent until a polymerizate if formed, and then separating the less soluble trans-1,4-polybutadiene from the remaining 62 polymerizate by room temperature extraction in n-pentane.

PO-1050
(5/69)

UNITED STATES PATENT OFFICE
CERTIFICATE OF CORRECTION

Patent No. __3,607,851__    Dated __September 21, 1971__

Inventor(s) __LAWRENCE E. FORMAN__

It is certified that error appears in the above-identified patent and that said Letters Patent are hereby corrected as shown below:

Col. 2, line 60, "trans-1,4 tg 93.0%" should read

--trans-1,4  --  93.0%-- line 70, "if" should read --is-- line 71, "62" at the end of the line should be eliminated.

Signed and sealed this 25th day of April 1972.

(SEAL)
Attest:

EDWARD M. FLETCHER, JR.
Attesting Officer

ROBERT GOTTSCHALK
Commissioner of Patents